United States Patent
Warkentin (10) Patent No.: US 11,971,839 B2
(45) Date of Patent: Apr. 30, 2024

(54) EXPOSING PCIE CONFIGURATION SPACES AS ECAM COMPATIBLE

(71) Applicant: VMware LLC, Palo Alto, CA (US)

(72) Inventor: Andrei Warkentin, South Elgin, IL (US)

(73) Assignee: VMware, Inc., Palo Alto, CA (US)

( * ) Notice: Subject to any disclaimer, the term of this patent is extended or adjusted under 35 U.S.C. 154(b) by 3 days.

(21) Appl. No.: 17/869,272

(22) Filed: Jul. 20, 2022

(65) Prior Publication Data

US 2024/0028547 A1  Jan. 25, 2024

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............. G06F 13/4221; G06F 2213/0026
See application file for complete search history.

(56) References Cited

U.S. PATENT DOCUMENTS

| | | | | |
|---|---|---|---|---|
| 2015/0006780 A1* | 1/2015 | Shao | ................... | G06F 13/4045 710/316 |
| 2018/0137074 A1* | 5/2018 | Sethi | ................... | G06F 12/1081 |
| 2022/0334994 A1* | 10/2022 | Harriman | .............. | G06F 13/404 |
| 2023/0140069 A1* | 5/2023 | Thomas | .............. | G06F 13/4022 710/105 |

* cited by examiner

*Primary Examiner* — Glenn A. Auve
(74) *Attorney, Agent, or Firm* — King Intellectual Asset Management (57) ABSTRACT

Disclosed are various approaches for exposing peripheral component interconnect express (PCIe) configuration space implementations as Enhanced Configuration Access Mechanism (ECAM)-compatible. In some examples, a bridge device is identified on a segment corresponding to a root complex of a computing device. An endpoint device is connected to a bus downstream from the bridge device. A synthetic segment identifier is assigned to the bus once the endpoint device is identified as connected to the bus. Synthetic address data is generated for the endpoint device. The synthetic address data includes the synthetic segment identifier for the bus and sets a bus identifier of the bus to zero regardless of a hierarchical position of the bus in a standard peripheral component interconnect express (PCIe) bus hierarchy.

20 Claims, 5 Drawing Sheets

EXPOSING PCIE CONFIGURATION SPACES AS ECAM COMPATIBLE

BACKGROUND

Some computing devices include or mandate System-Ready (SR) compliance including a standards-compliant peripheral component interconnect express (PCIe) root complex implementation. However, some of these computing devices are Enhanced Configuration Access Mechanism (ECAM) incompatible or partially incompatible. For example, Advanced Reduced Instruction Set Computer (RISC) Machine (ARM)® processor platforms including server and non-server ARM® hardware frequently include PCIe root complex implementations that are partially or entirely incompatible.

In ECAM, given a Bus, Device, Function (BDF) identifier, a memory-mapped input/output (MMIO) address can be used to access the BDF identifier's configuration space. Examples of such incompatibilities include the use of separate configuration space ranges for the root port registers, use of an inappropriate Address Translation Unit (ATU) translation granule incompatible with ECAM (e.g., 64k instead of 32k), combined with a lack of Transaction Layer Packet (TLP) filtering for configuration space accesses such as "CFG0" accesses, incorrect offsets that conflict with the correct encoding of bus numbers in ECAM, and so on. All of these lead to an inability to scan devices correctly, inability to scan correct busses, inability to consume devices that are more complex than a single endpoint, incorrect routing identifier (RID) assignment by device and thus non-functioning Message Signaled Interrupts (MSI) interrupts, as well as "mirrors" and "shadows" that result in the same PCIe endpoint being detected at multiple locations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of mechanisms for exposing peripheral component interconnect express (PCIe) configuration space implementations as Enhanced Configuration Access Mechanism (ECAM)-compatible. For example, some computing devices have SystemReady (SR) compliance including a standards-compliant peripheral component interconnect express (PCIe) root complex implementation. These computing devices can in practice be ECAM incompatible, partially incompatible, or otherwise de facto incompatible. For example, Advanced Reduced Instruction Set Computer (RISC) Machine (ARM)® processor platforms including server and non-server ARM® hardware frequently include PCIe root complex implementations that are partially or entirely incompatible. This can lead to operating system errors and crashes.

Incompatibilities include the use of separate configuration space ranges for the root port registers, use of an inappropriate Address Translation Unit (ATU) translation granule incompatible with ECAM (e.g., 64k minimum granule with 32k of device space), combined with a lack of Transaction Layer Packet (TLP) filtering for configuration space accesses such as "CFG0" accesses, incorrect offsets that conflict with the correct encoding of bus numbers in ECAM, and so on. All of these lead to inability to scan devices correctly, inability to scan correct busses, inability to consume devices that are more complex than a single endpoint, incorrect routing identifier (RID) assignment by device and thus non-functioning Message Signaled Interrupts (MSI) interrupts, as well as "mirrors" and "shadows" that result in the same PCIe endpoint being detected at multiple locations. However, the present disclosure describes mechanisms that can correct these issues using non-standard PCIe configuration space implementations that are exposed as ECAM-compatible using Advanced Configuration and Power Interface (ACPI) firmware. This can include using synthetic segment identifiers and modified or synthetic BDF identifiers, where each physical bus corresponds to a synthetic segment identifier.

Figure 1:
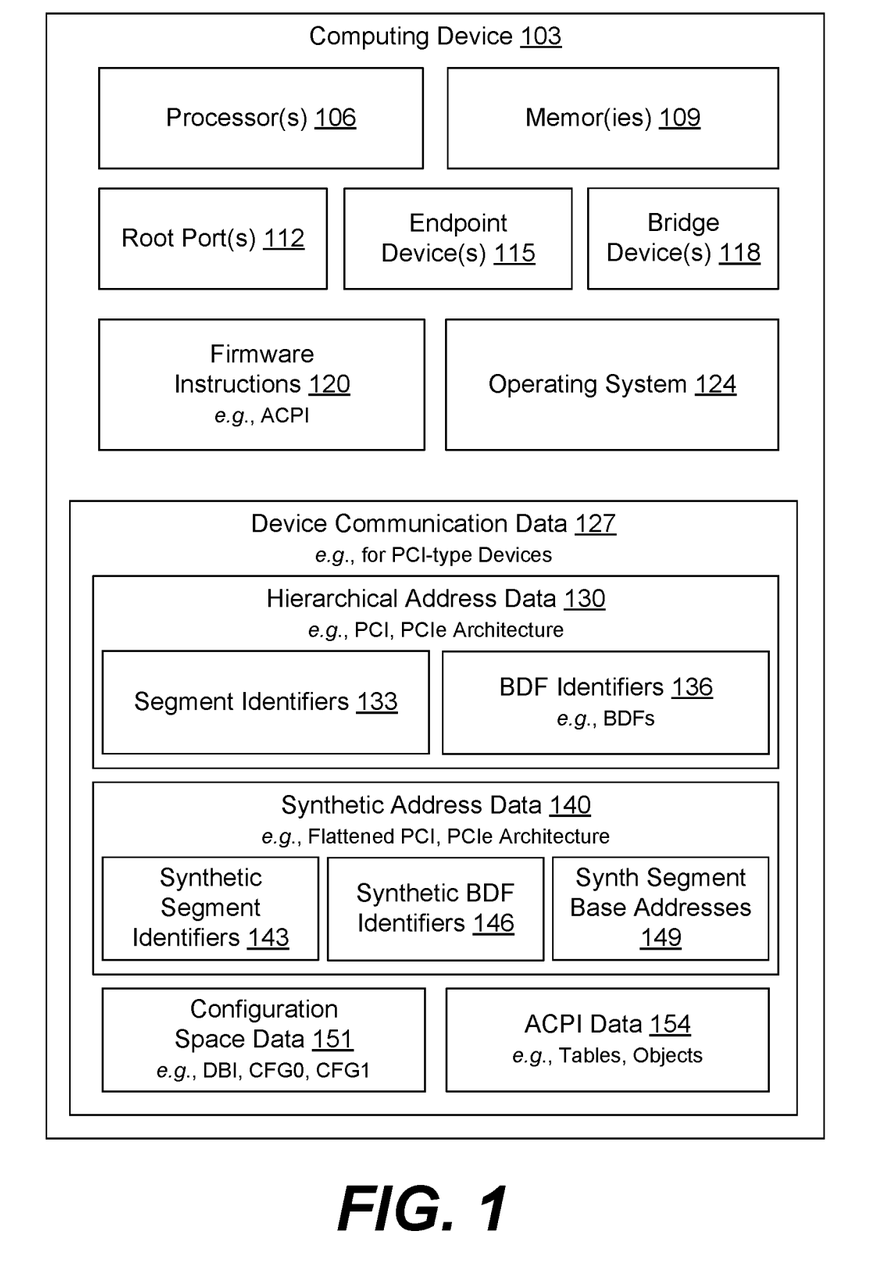
FIG. 1 is a schematic block diagram depicting an example of a computing device that includes a mechanism for exposing PCIe configuration space implementations as ECAM-compatible, according to examples of the disclosure.

Beginning with FIG. 1, shown is an example of a computing device 103. The computing device 103 can include processors 106, memories 109, root ports 112, endpoint devices 115, bridge devices 118, among other physical components. The computing device 103 can also execute various computer-readable instructions including firmware instructions 120, an operating system 124, as well as applications, programs, and other instructions. These instructions can be stored in a data store accessible to the computing device 103. The data store can include or be provided by one or more of the memories 109.

The computing device 103 can include, for example, a processor-based system such as an x86 or Advanced RISC Machine (ARM) computer system. Examples of these computer systems can include a server computer, a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The computing device 103 can include or exclude one or more displays, such as liquid crystal displays (LCDs), gas plasma-based flat panel displays, organic light emitting diode (OLED) displays, electrophoretic ink ("E-ink") displays, projectors, or other types of display devices. In some instances, a display can be a component that can be connected to the computing device 103 through a wired or wireless connection. The computing device 103 can be configured to execute instructions including the firmware instructions 120, an operating system 124, as well as various applications and services.

A processor 106 can be part of a processing circuit that can include one or more processors and one or more storage devices of the memories 109 that are coupled to a local interface. A memory 109 can include one or more computer readable mediums for a processing circuit which can store data or components that are executable by the one or more processors of the processing circuit. The memories 109 can refer to non-transitory computer readable media such as magnetic, optical, or semiconductor media. More specific examples of a suitable computer-readable medium include solid-state drives, flash memory including volatile and non-volatile memories 109.

A root port 112 can refer to a port on a root complex of the computing device 103. The root complex can include a portion of a motherboard that contains a host bridge. The root complex can connect the processors 106 and memories 109 to PCIe architecture through the root ports 112. The computing device 103 can include a single root port 112 or multiple root ports 112 in various examples.

An endpoint device 115 can refer to a device that is at the bottom of the branches of a tree topology of the standard or hierarchical address data 130 and implements a single upstream port toward the root port 112. An endpoint device 115 can refer to a discrete hardware device or a portion of a hardware device. A PCIe endpoint device 115 is device 0 on its bus. An endpoint device 115 can include one or more functions up to 8 functions and a configuration space of 4k per function. This causes the configuration space of a particular endpoint device 115 to be 32k large.

A bridge device 118 can refer to a bridge or switch since an operating system 124 can see either device as a bridge device 118. Bridge devices 118 can refer to hardware that connects between upstream and downstream busses of a PCI type architecture such as PCI or PCIe.

Firmware instructions 120 can include ACPI firmware and other firmware instructions. The firmware instructions 120 can generate and write device communication data 127. This can include generating ACPI data 154 and loading them into a memory 109. The ACPI data 154 can include the configuration space data 151. The firmware instructions 120 can include bytecode of ACPI Machine Language (AML). Firmware instructions 120 in the present disclosure can include instructions that generate the "standard" or hierarchical address data 130, the synthetic address data 140, as well as mappings between them. The firmware instructions 120 can also generate the configuration space data 151 and ACPI data 154, and other objects and data that are provided to the operating system 124 in order to access the endpoint devices 115. The configuration space data 151 and ACPI data 154, and other objects and data can include data that includes or is generated using the synthetic address data 140 as well as the PCIe standard hierarchical address data 130.

The firmware instructions 120 can generate the configuration space data 151 and ACPI data 154 such that the synthetic address data 140 is exposed as ECAM-compatible. The firmware instructions 120 can translate memory mapped input output (MMIO) to configuration cycles in an ECAM-compatible manner such that a 1 MB range is mapped to each bus. This enables standard PCI scan logic to identify missing devices and work in the typical manner, while also providing a flattened hierarchy where each synthetic segment has one bus 0 (bus range 0-0). A physical PCI bus 0 and the root port 112 are not exposed to the operating system 124.

Bridge devices 118 are also unexposed to the operating system. The firmware instructions 120 generate synthetic address data 140 that causes a multi-device adapter that includes multiple endpoint devices 115 to be exposed in a manner where a maximum of a single endpoint device 115 exists per synthetic segment. A bridge device 118 can have a synthetic segment and corresponding synthetic segment identifier 143 as well. However, the firmware instructions 120 can mark the bridge device 118 and/or synthetic segment as disabled, so the operating system 124 will ignore it in practice. A multi-device adapter can include eXtensible Host Controller Interface (xHCI) devices, combo xHCI/Advanced Host Controller Interface (AHCI) adapters and others.

The firmware instructions 120 can scan the computing device 103 using register interactions and other actions. The firmware instructions 120 scanning process can identify the physical segments and corresponding segment identifiers 133. The firmware instructions 120 can identify all bridge devices 118 on each physical segment. For each bridge device 118 corresponding to a bus, the firmware instructions 120 can assign a synthetic segment identifier 143 to the bus downstream of the bridge device 118. In some cases, the bridge device 118 can be assigned a synthetic segment identifier 143, as well. The firmware instructions 120 can mark the device itself as disabled so the operating system 124 will ignore the bridge device 118 and will not attempt to traverse the bus hierarchy or identify downstream devices.

The firmware instructions 120 can also check for a filtering or granule problem. In other words, the firmware instructions 120 can identify whether the minimum granule size is greater than the device configuration space of 32k. For example, the firmware instructions 120 can use register interactions to identify whether a particular endpoint device 115 responds to device 1, as well as device 0. If so, then the firmware instructions 120 can add 0x8000 to a synthetic segment base address associated with that endpoint device's 115 synthetic segment identifier 143.

The firmware instructions 120 can generate configuration space data 151 using the synthetic address data 140. The firmware instructions 120 can generate multiple configuration spaces in the configuration space data 151. The firmware instructions 120 can generate configuration space "CFG0" using the minimum granule size of the computing device 103. Configuration space "CFG0" can be limited to or used exclusively for the first bus downstream from a root port 112. The firmware instructions 120 can generate configuration space "CFG1" for all other busses. The firmware instructions 120 can generate configuration space "CFG1" using a "shifted ECAM" mode. In other words, "CFG1" can enable a static memory window to cover a configuration space of the entire bus range.

The firmware instructions 120 can generate ACPI mapped configuration space (MCFG) base address description table entries in an ACPI MCFG table that describes the location of each configuration space. This can be done at compile time, describing a predetermined number of busses per synthetic segment, such as 5 busses per synthetic segment, 10 busses per synthetic segment, or 1 bus per synthetic segment. Examples with multiple busses per synthetic segment can include multiple busses with bridge devices 118 attached, and can be limited to a single bus that has an endpoint device 115 attached. The endpoint device 115 can correspond to device 0 on bus 0. The bridge devices 118 can correspond to the additional devices on bus 0 and devices on other busses of the synthetic segment.

The MCFG entry that matches the first physical downstream bus on each physical segment can have 0x8000 added to its corresponding synthetic segment base address 149 if an endpoint device 115 connected to that bus responds similarly to multiple different device identifiers such as device 0 and device 1 of the bus. This can be performed during UEFI initialization.

The firmware instructions 120 can programmatically generate Differentiated System Description Table (DSDT) Root Complex entries (PNP0A08), one per actual PCIe bridge device 118 scanned and identified in the computing device 103. E.g., one per actual physical PCIe bus. This can be performed using an AML template and patching variables of interest to the device specifics.

The variables of interest to patch can include:
//_UID/_SEG, corresponding to or including the synthetic segment identifier 143; //RUID, corresponding to the real or actual segment identifier 133 for calculating MMIO register for PCIe link detection;
// CFGB, corresponding to real configuration base address for accessing a device on a particular synthetic segment, which can be used to detect downstream device type;
// MB32, corresponding to MMIO resources exposed to downstream device
// MS32, corresponding to size of MB32
// MBPF, corresponding to prefetchable MMIO resources exposed to downstream device
// MSPF, corresponding to the prefetchable window size
// IOBA, corresponding to PCI I/O resources exposed to downstream device
// IOCA, corresponding to CPU side (MMIO) address of IOBA
// IOSI, corresponding to size of exposed to downstream device Custom ASL can mark the device as disabled if device 0 on the corresponding physical bus is a bridge device 118. If the PCIe link for the real root complex goes away, this can make the operating system accesses cause a crash. Custom ASL and/or firmware instructions 120 can manipulate Operation Regions to access the relevant ranges. For example, using an _STA method:

OperationRegion (CFGS, SystemMemory, CFGB, 0x10)
Field (CFGS, ByteAcc, NoLock, Preserve) {
  Offset (0xE),
  TYPE, 8
  }
if ((TYPE & 0x7F) !=0) {
  return 0xf
}// only report present/enabled if the downstream device is not a PCI bridge The resources (TO aperture) described in _CRS for the synthetic segment can be enforced to match the actual P2P bridge apertures—MMIO32, prefetch and IO. Legacy INTx routing can match the physical INTx for devices on the physical bus. This can be performed using a barberpole algorithm.

In order to support MSI interrupts in typical ARM environments, including employing an Interrupt Translation Service (ITS), the firmware instructions 120 can generate an ACPI Input Output Remapping Table (IORT) ACPI table. The IORT ACPI table can describe the synthetic segment identifiers 143 and other synthetic address data 140 to standard hierarchical address data 130 mapping, taking into account the special handling for functions corresponding to a "+0x8000" synthetic segment base address 149 modification. For any such endpoint device 115 and function the correct bus needs to be encoded for lookup via the IORT in the ACPI data 154. _OSC for native PCIe mode can be removed from these segments, otherwise the operating system 124 can "code 10" on attached PCIe devices and fail to start them. In other words, these segments need to be described as PCI segments without support for native PCIe mode.

An operating system 124 can include an interpreter for the AML bytecode that enables the operating system 124 to make use of the ACPI data 154 generated by the firmware instructions 120. An AML interpreter implementation can be provided by the ACPI Component Architecture (ACPICA). The AML bytecode can be compiled from ACPI Source Language (ASL) code.

The computing device 103 can also store device communication data 127 that the operating system 124 and the other executable instructions can use to access and control the various physical devices such as endpoint devices 115. The device communication data 127 can include hierarchical address data 130 and synthetic address data 140.

The hierarchical address data 130 can include segment identifiers 133 and BDF identifiers 136. The segment identifiers 133 and BDF identifiers 136 can be considered "real," "actual," or otherwise PCIe standard segment identifiers 133 and BDF identifiers 136. The hierarchical address data 130 can also include register data, base addresses, and other data in a standard PCI or PCIe architecture.

Generally, the segment identifiers 133 and BDF identifiers 136 can describe the interconnection of various physical components of the computing device 103 in a tree-like hierarchical architecture of BDF identifiers 136. A segment identifier 133 of the hierarchical address data 130 can refer to address bits that specify a segment, which can also be referred to as a segment group. A segment identifier 133 can be associated with a 256 MB-aligned base address block, and can include 16 address bits, corresponding to bits 43 to 28 of the overall ECAM address range. A segment identifier 133 can correspond to a PCI segment group of one or more host bridges or root ports 112. The 16 bit segment identifier 133 can be the lower 16 bits of an integer returned for _SEG. The higher bits can be reserved.

An BDF identifier 136 can include a Bus identifier, Device identifier, and Function identifier that together can be referred to as a "BDF." The BDF can be a 16 bit number that locates a function of a PCI device such as an endpoint device 115 or a bridge device 118. The BDF can refer to address bits corresponding to the base identifier, device identifier, and function identifier for a device such as an endpoint device 115 or a bridge device 118. The bus identifier can be an 8 bit number capable of addressing up to 256 busses (0-255). The bus identifier address bits can be address bits 27 to 20 of the ECAM address. The device identifier can be a 5 bit number capable of addressing up to 32 devices (0-31). The device identifier address bits can be address bits 19 to 15 of the ECAM address. The function identifier can be a 3 bit number capable of addressing up to 8 functions. Address bits 11 to 0 can refer to a 4k configuration space region for a specified function. The hierarchical address data 130 can include all of these address bits, as well as base addresses and other information. The function identifier address bits can be address bits 14 to 12 of the ECAM address. Briefly put, each segment can have 256 busses, each bus can have up to 32 devices, and each device can have up to 8 functions. The PCIe standard indicates that endpoint devices 115 are always indicated as device "0" on a corresponding bus. However, bridge devices 118 can have device identifiers greater than or equal to 0.

The BDF identifier 136 can be a hierarchically enumerated (e.g., PCIe-standard) BDF. The hierarchical address data 130 can also specify primary, secondary, and subordinate bus numbers for each bus. This can form a hierarchical structure for the busses. The primary bus number can be a bus number immediately upstream of a particular bridge device 118. The secondary bus number and the subordinate bus number can be used to describe the set of all busses that can be accessed downstream from the bus number and immediately upstream of a particular bridge device 118. The secondary bus number can be the first or immediately downstream of a particular bridge device 118. The subordinate bus number can refer to the highest bus number of the busses that can be reached downstream of that bridge device 118. As a result, the hierarchical address data 130 can include a hierarchical architecture that can be described as a tree-like hierarchy of busses or bus hierarchy.

The synthetic address data 140 can include synthetic segment identifiers 143, synthetic BDF identifiers 146, synthetic segment base addresses 149, and other non-standard address data. Generally, the synthetic address data 140 can "flatten" the bus architecture so that each bus is designated "bus 0," which can be the first and only bus of each synthetic segment identifier 143. A synthetic segment identifier 143 can be a software abstraction that leverages a false or synthetic version of a standard segment identifier 133. The use of synthetic address data 140 can flatten the hierarchy such that all busses throughout the standard bus hierarchy are redescribed and addressed as "root busses," or busses of root ports 112 with no downstream busses.

The synthetic BDF identifiers 146 can be modified versions of the standard BDF identifiers 136, which are modified to designate each bus as "bus 0" of a particular synthetic segment associated with a synthetic segment identifier 143. For example, if an BDF identifier 136 for an endpoint device 115 corresponds to BDF 5:0:1, the synthetic segment identifier 143 can be 0:0:1. Since all busses are bus 0, or the first bus of a corresponding synthetic segment identifier 143, the architecture can be referred to as flattened. Each synthetic segment identifier 143 can be associated with a particular base address, referred to as its synthetic segment base address 149. While real segment identifiers 133 can refer to segments of 256 MB of configuration space, the synthetic BDF identifiers 146 can refer to synthetic segments of 1 MB of space, which is non-standard and does not correspond to the PCIe standard. However, the operating system 124 and other instructions can nevertheless utilize and accurately process the address bits of the synthetic segment identifier 143 despite the non-standard spacing. Using many real segments can be costly or lossy in terms of memory space, but the synthetic segments corresponding to synthetic segment identifiers 143 can reduce memory usage.

The synthetic segment identifier 143 can include address bits described as an 8 bit number capable of addressing up to 256 segments (0-255), corresponding to bits 35 to 28 of the overall ECAM address range. Bits 43 to 33 can be a synthetic segment prefix of all zeros. The synthetic segment identifier 143 can alternatively be described to include 35 address bits, corresponding to bits 63 to 28 of the overall ECAM address range, where bits 63 to 33 are zeros. The synthetic segment identifier 143 can also start at a predetermined offset such that segments are referred to as starting at any segment number, such as 5, 10, 11, 20, 21, 30, or any offset.

In PCIe, endpoint devices 115 are indicated as device "0" on a corresponding bus. However, bridge devices 118 can have device identifiers greater than or equal to 0. Each synthetic segment identifier 143 can be associated with a particular base address, referred to as its synthetic segment base address 149. For an endpoint device 115 connected through the first bus downstream from a physical root port 112, if the first downstream bus is associated with a minimum granule greater than the device address space or configuration space of 32k, and/or if a function of the endpoint device 115 responds to a register interaction that addresses device 1 rather than device 0 (i.e., exhibits "mirroring" or "shadowing"), then the firmware instructions 120 can add 0x8000 to the synthetic segment base address 149. The register interaction can include one or more of writing to a particular register and reading from the same or a different register. Adding 0x8000 to the synthetic segment base address 149 can prevent the mirroring or shadowing effect by preventing the endpoint device 115 from responding to a register interaction that addresses device 1 rather than device 0.

Figure 2:
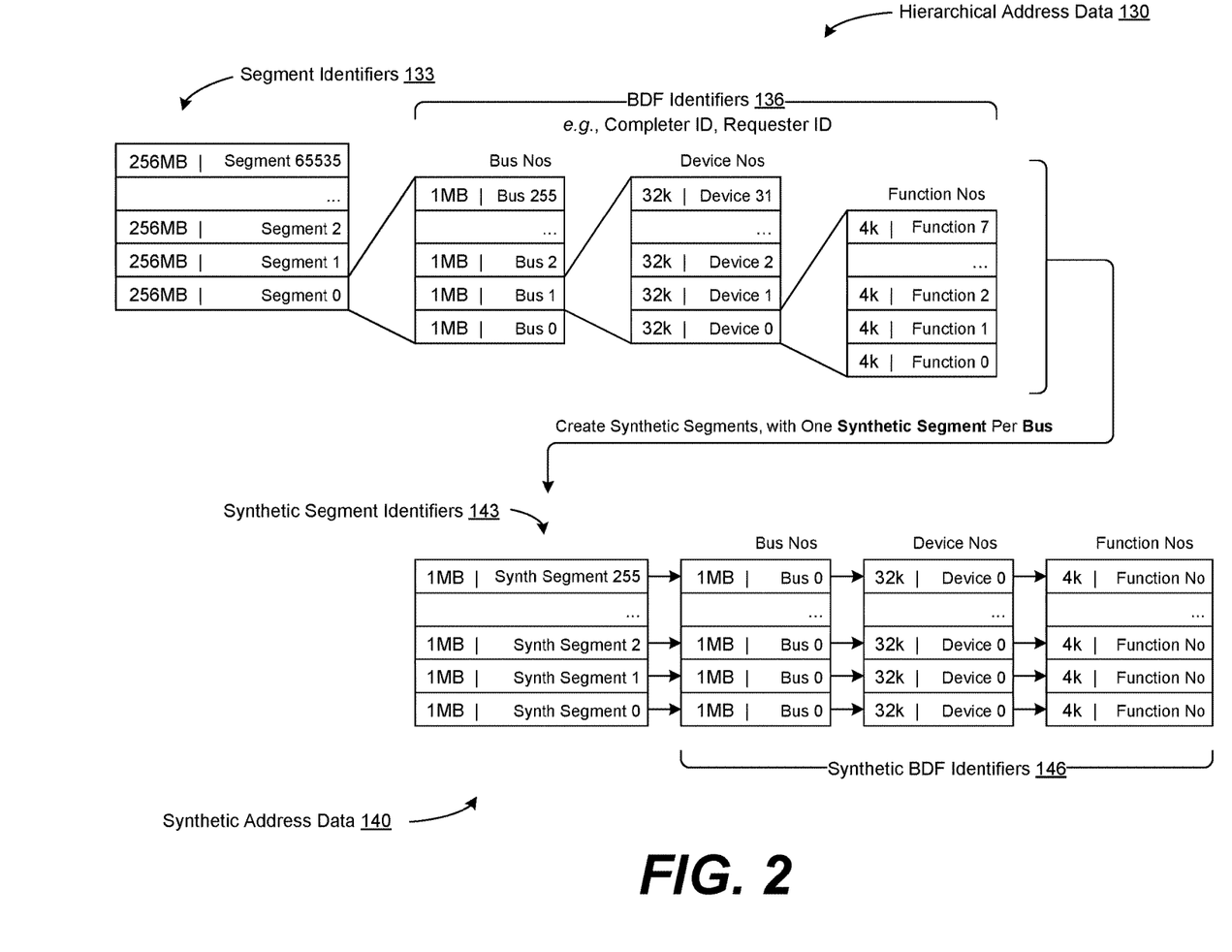
FIG. 2 depicts example operations for exposing PCIe configuration space implementations as ECAM-compatible, according to examples of the disclosure.

Referring next to FIG. 2, shown is a scenario that depicts aspects of exposing PCIe configuration space implementations as ECAM-compatible. Specifically, the figures show an example of the hierarchical address data 130 identified by the firmware instructions 120, as well as synthetic address data 140 that is generated by the firmware instructions 120.

The firmware instructions 120 can scan the computing devices 103 to identify the hierarchical address data 130 according to a PCIe standard. The hierarchical address data 130 can include a number of segment identifiers 133 corresponding to segments or segment groups of the computing device 103. In some examples, a particular segment group can correspond to a physical host bridge or a physical root port 112. However, a single segment group can also include multiple host bridges or physical root ports 112. There can be up to 65,536 segment groups at maximum in the PCIe standard, since the segment identifier 133 can include 16 bits. Segment groups are often unutilized unless the number of busses exceeds 256. Each segment group corresponding to a standard segment identifier 133 can correspond to 256 MB of address space.

An expanded view of "segment 0" is shown as an example. Segment 0 can include up to 256 busses (0 to 255). Each bus number or bus identifier can correspond to 1 MB of address space. An expanded view of "bus 1" is shown to include up to 32 devices (0 to 31). However, endpoint devices 115 are designated device 0 in the PCIe standard, and the remaining devices, if any, can be bridge devices 118. An expanded view of "device 0" is shown to include up to 0 functions (0 to 7). The hierarchical address data 130 can also specify primary, secondary, and subordinate bus numbers for each bus. As a result, the hierarchical address data 130 can include a hierarchical architecture that can be described as a tree-like hierarchy of busses or bus hierarchy.

The synthetic address data 140 can include synthetic segment identifiers 143, synthetic BDF identifiers 146, synthetic segment base addresses 149, and other non-standard address data. Generally, the synthetic address data 140 can "flatten" the bus architecture so that each bus is designated "bus 0," which can be the first and only bus of each synthetic segment identifier 143. A synthetic segment identifier 143 can be a software abstraction that leverages a false or synthetic version of a standard segment identifier 133. The use of synthetic address data 140 can flatten the hierarchy such that all busses throughout the standard bus hierarchy are redescribed and addressed as "root busses," or busses of root ports 112 with no downstream busses.

The synthetic BDF identifiers 146 can be modified versions of the standard BDF identifiers 136, which are modified to designate each bus as "bus 0" of a particular synthetic segment associated with a synthetic segment identifier 143. Since all busses are bus 0, or the first bus of a corresponding synthetic segment identifier 143, the architecture can be referred to as flattened. While real segment identifiers 133 can refer to segments of 256 MB of configuration space, the synthetic BDF identifiers 146 can refer to synthetic segments of 1 MB of space, which is non-standard and does not correspond to the PCIe standard. However, the operating system 124 and other instructions can nevertheless utilize and accurately process the address bits of the synthetic segment identifier 143 despite the non-standard spacing. Using many real segments can be costly or lossy in terms of memory space, but the synthetic segments corresponding to synthetic segment identifiers 143 can reduce memory usage.

Figure 3:
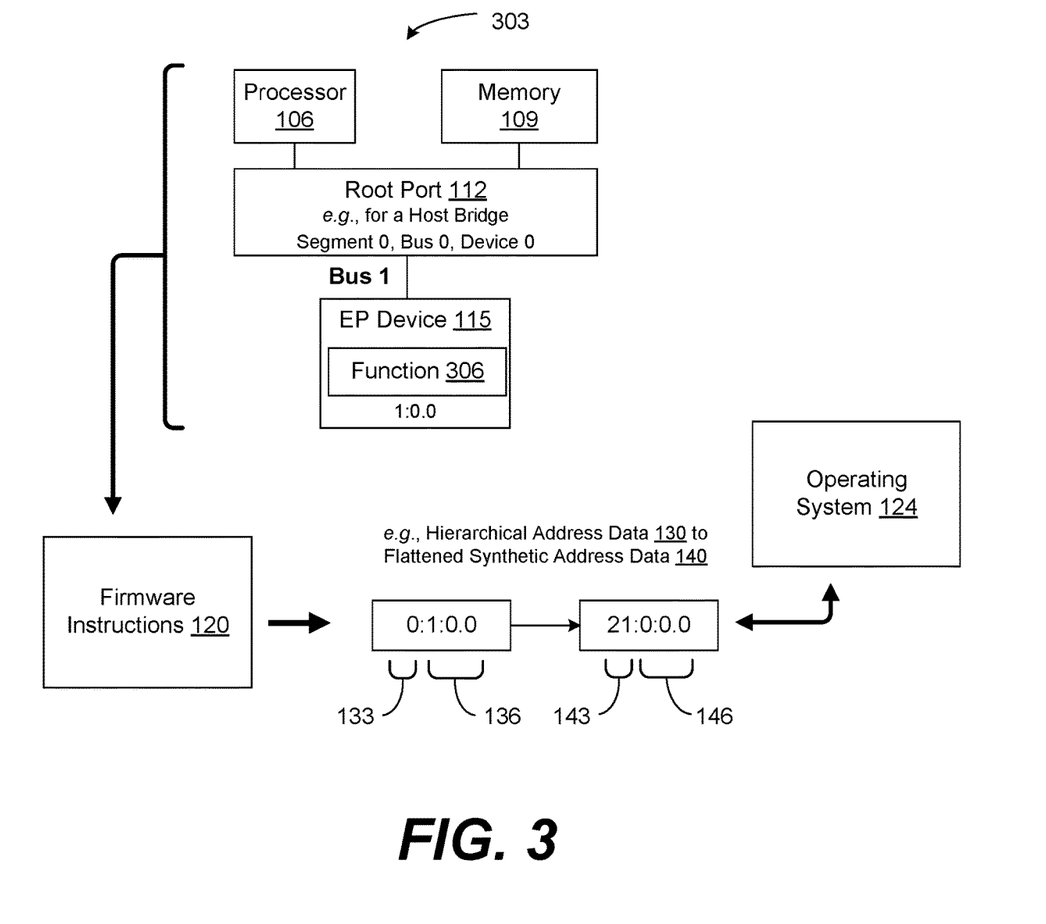
FIG. 3 depicts further example operations for exposing PCIe configuration space implementations as ECAM-compatible, according to examples of the disclosure.

FIG. 3 shows interconnected components 303 of the computing device 103, including a processor 106, a memory 109, a root port 112, and an endpoint device 115. The figure depicts how the firmware instructions 120 can identify hierarchical address data 130 and synthetic address data 140. The firmware instructions 120 can in some examples identify the hierarchical address data 130 and translate it into synthetic address data 140. The firmware instructions 120 can also generate and store a mapping between the hierarchical address data 130 and synthetic address data 140.

The endpoint device 115 connects to the root port 112 through bus 1. Bus 1 can be the first bus downstream from the root port 112. Bus 0 can refer to an internal bus upstream from the root port 112. In some examples, the root port 112 connects to the processor 106 and the memory 109 through a host bridge and a root complex. Bus 0 can be an internal bus of the root complex and/or the host bridge. The root port 112 connects to the processor 106 and the memory 109. The endpoint device 115 can include a function 306. The function 306 can be an action performed by the endpoint device 115 in response to instructions that address the function 306. The function 306 of the endpoint device can correspond to an address that includes a BDF identifier 136. The BDF identifier 136 can be 1:0.0 in this example.

The firmware instructions 120 can scan the computing device 103 to identify all segments, busses, bridge devices 118, endpoint devices 115, and functions of the endpoint devices 115. The firmware instructions 120 can use register interactions such as reading and writing from certain registers in order to perform the scan. Each bridge device 118 can be associated with a bus that is upstream and a bus that is downstream from the bridge device 118. The firmware instructions 120 can identify all segments and for each segment, perform a scan to identify each bridge device 118 corresponding to a physical bus.

In this nonlimiting example, the firmware instructions 120 can identify segment 0 as a logical or physical segment. A physical segment can include a root complex of the computing device 103 that includes one or more root ports 112 corresponding to one or more host bridges. The firmware instructions 120 can identify that segment 0 can include an internal host bridge device. The firmware instructions 120 can assign the bus upstream from the host bridge as bus 0, and can assign bus identifier 1 to a physical bus downstream from the host bridge. The firmware instructions 120 can check whether the bus 1 includes any connected devices.

The devices can include bridge devices 118 or endpoint devices 115. In this example, the firmware instructions 120 can identify that device 0 and function 0 are responsive to register interactions. Accordingly, the firmware instructions 120 can identify that endpoint device 115 is connected to bus 1, and that the endpoint device 115 includes a single function 306 at the function identifier 0. The BDF identifier 136 for the endpoint device 115 and the function 306 can be 1:0.0.

The firmware instructions 120 can identify hierarchical address data 130 that specifies a segment identifier 133 "0" and a BDF identifier 136 "1:0.0" for the endpoint device 115 and the function 306. Since the root port 112 is on bus 0 of segment 0, the hierarchical address data 130 can include 0:1:0.0, corresponding to Segment:Bus:Device.Function. The firmware instructions 120 can map this hierarchical address data 130 to the synthetic address data 140.

The firmware instructions 120 can generate a synthetic segment and synthetic segment identifier 143 for each endpoint device 115, and set the bus identifier to 0. The bus identifier is set to 0 in the synthetic address data 140 regardless of a hierarchical position of the bus in a standard peripheral component interconnect express (PCIe) bus hierarchy. The synthetic segment identifier 143 can start at any number or offset. In this example, the resulting synthetic address data 140 for the endpoint device 115 and the function 306 can include Syntheticsegment:Bus:Device.Function 21:0:0.0. In some examples, the firmware instructions 120 can generate a synthetic segment and synthetic segment identifier 143 for the host bridge of the root port 112. The host bridge device can correspond to hierarchical address data 130 including Segment:Bus:Device 0:0.0, and synthetic address data 140 including Syntheticsegment:Bus:Device 20:0.0. However, the host bridge device can be marked as disabled so that it is not exposed to the operating system 124. Each synthetic segment identifier 143 can be limited to a single device on bus 0, whether it is a bridge device 118 or an endpoint device 115. However, the bridge devices 118 and corresponding synthetic segment 143 can be marked as disabled. Each synthetic segment 144 can be associated with a particular ECAM base address referred to as a synthetic segment base address 149.

The firmware instructions 120 can generate configuration space data 151 and ACPI data 154 using the synthetic address data 140. The firmware instructions 120 can also use the hierarchical address data 130 as well as the mapping between the synthetic address data 140 and the hierarchical address data 130 to generate some aspects of the configuration space data 151 and the ACPI data 154. The operating system 124 can use the configuration space data 151 and the ACPI data 154 to access the endpoint device 115. Since this information is primarily based on the synthetic address data 140, the operating system 124 can access any complex hierarchical structure of busses as if each bus were directly attached to a root port 112.

The firmware instructions 120 can check whether the endpoint device 115 responds to device 1 (and function 0) responds in a manner similar to its response to addressing device 0. If the endpoint device 115 responds to device 1 in a manner similar to its response to addressing device 0, then the endpoint device 115 can have a mirroring or shadowing error. Endpoint devices 115 connected to a first bus downstream from a root port 112, such as the endpoint device 115 in this example, can exhibit mirroring or shadowing as a result of a filtering problem or granule size larger than 32k such as a 64k granule.

For example, if an ATU granule is incompatible with ECAM, such as using a 64k minimum granule with 32k of device space as is standard in PCIe, and the endpoint device 115 and/or root port 112 does not perform TLP filtering for configuration space accesses, then device 0 can be mirrored as device 1, even if there are no additional physical or logical devices. If the endpoint device 115 lacks Alternate Routing ID Interpretation (ARI) then it can accept any accesses, even if these target the wrong device. On the other hand, an ARI capable endpoint device 115 can reject accesses that are not addressed using the correct device identifier.

The firmware instructions 120 can add 0x8000 in hexadecimal to the synthetic segment base address 149 corresponding to the endpoint device 115 if a filtering or granule size problem is identified. This ensures that further attempts by an operating system 124 to access what it thinks is device 1 will fail, as it will extend past the mapped 64K window. The firmware instructions 120 can add 0x8000 selectively, and in some examples only if the endpoint device 115 responds at base+0x8000, or in other words if the endpoint device 115 responds similarly to both device 0 and device 1. If the endpoint device 115 does not respond, then 0x8000 is not added to the synthetic segment base address 149.

Figure 4:
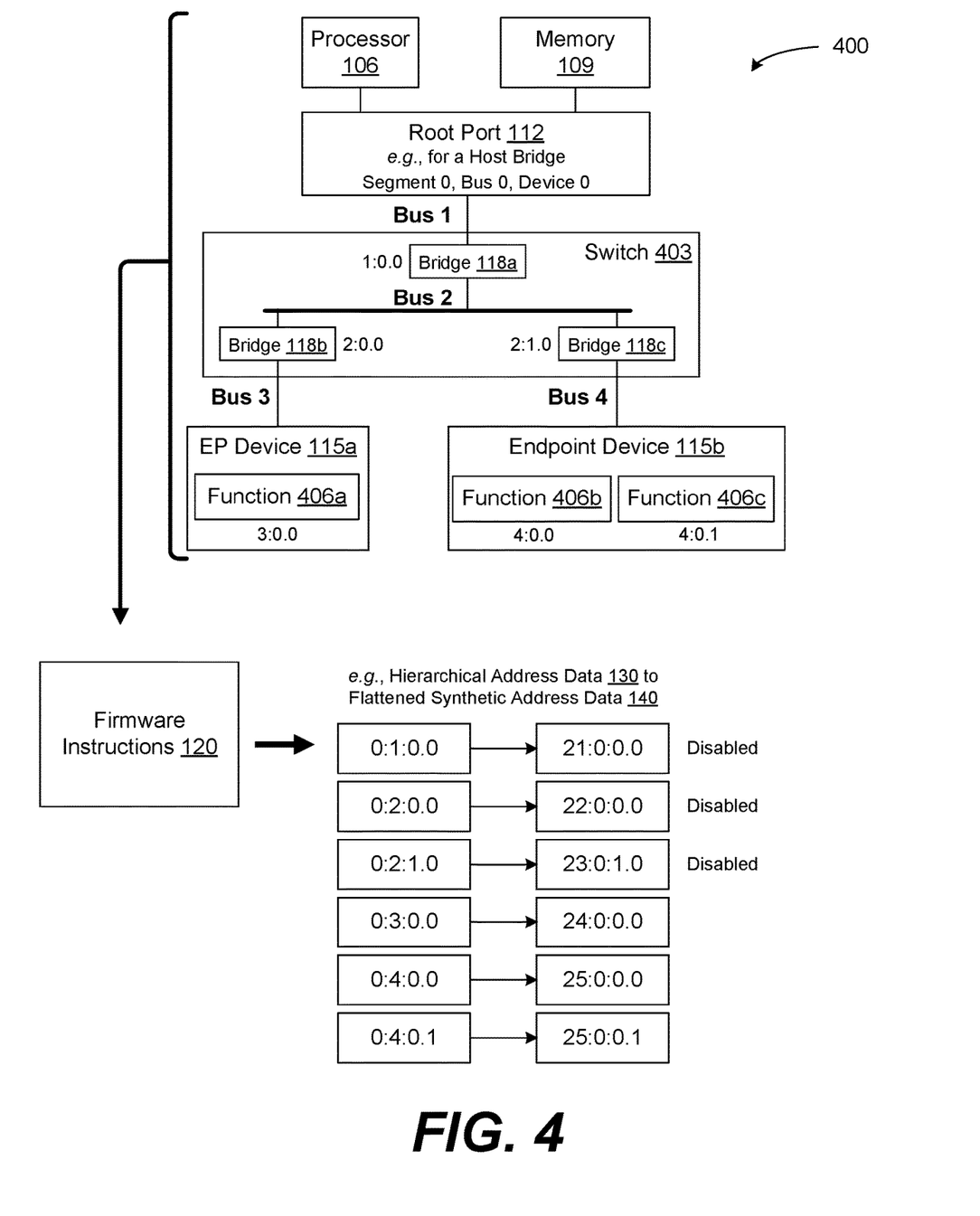
FIG. 4 depicts further example operations for exposing PCIe configuration space implementations as ECAM-compatible, according to examples of the disclosure.

FIG. 4 shows interconnected components 400 of the computing device 103, including a processor 106, a memory 109, a root port 112, a switch 403, an endpoint device 115a, and an endpoint device 115b. The figure depicts how the firmware instructions 120 can identify hierarchical address data 130 and synthetic address data 140 to address the endpoint devices 115a and 115b. The firmware instructions 120 can in some examples identify the hierarchical address data 130 and translate it into synthetic address data 140. The firmware instructions 120 can also generate and store a mapping between the hierarchical address data 130 and synthetic address data 140. In the example shown, the firmware instructions 120 can assign one bus per synthetic segment, whether the bus has a downstream bridge device 118 or a downstream endpoint device 115. However, other examples can assign a synthetic segment identifier 143 to multiple busses while limiting the synthetic segment identifier 143 to a single bus that has a downstream endpoint device 115. The synthetic segment identifier 143 can be considered to be limited to a single endpoint device 115 in either example.

The switch 403 can be considered a bridge device 118 that includes virtual and/or physical bridge devices 118a, 118b, and 118c. The switch 403 can connect to the root port 112 through bus 1. Bus 1 can be the first bus downstream from the root port 112. Bus 0 can refer to an internal bus upstream from the host bridge of the root port 112. The root port 112 connects to the processor 106 and the memory 109 through a root complex and a host bridge.

Bus 2 can be a downstream bus from the bridge device 118a. The bridge devices 118b and 118c can connect to the bridge device 118a through bus 2. The endpoint device 115a can connect to the bridge device 118b using bus 3. The endpoint device 115b can connect to the bridge device 118c using bus 4. The endpoint device 115a can include a single function 406a. The endpoint device 115b can include multiple functions 406b and 406c. The various busses form a hierarchical structure. However, the mechanisms described can reform the hierarchical bus structure into a flattened synthetic architecture.

The firmware instructions 120 can scan the computing device 103 to identify all segments, busses, bridge devices 118, endpoint devices 115, and functions of the endpoint devices 115a and 115b. The firmware instructions 120 can use register interactions such as reading and writing from certain registers in order to perform the scan. Each bridge device 118, including the switch 403, the bridge device 118a, the bridge device 118b, and the bridge device 118c can be associated with an upstream bus and a downstream bus. The firmware instructions 120 can identify all segments. For each segment, the firmware instructions 120 can identify each bridge device 118 corresponding to a bus.

In this nonlimiting example, the firmware instructions 120 can identify segment 0 as a logical or physical segment. The firmware instructions 120 can identify that segment 0 can include an internal host bridge device associated with the root port 112. The firmware instructions 120 can assign bus identifier 0 to the upstream bus, and can assign bus identifier 1 to the downstream bus. The firmware instructions 120 can identify hierarchical address data 130 indicating that bus 1 is secondary to bus 0.

The firmware instructions 120 can identify that the bridge device 118a connects to bus 1. The BDF identifier 136 corresponding to the bridge device 118a can be 1:0.0. The firmware instructions 120 can assign bus identifier 2 to the bus downstream from the bridge device 118a. The firmware instructions 120 can identify that bus 2 is secondary to bus 1 and subordinate to bus 0. The firmware instructions 120 can check whether bus 2 includes any devices connected. Bridge devices 118b and 118c can be connected to bus 2. The BDF identifier 136 corresponding to the bridge device 118b can be 2:0.0. The BDF identifier 136 corresponding to the bridge device 118c can be 2:1.0.

The firmware instructions 120 can assign bus identifier 3 to the bus downstream from the bridge device 118b. The firmware instructions 120 can identify that the endpoint device 115a is connected to bus 3, and that endpoint device 115a responds to a single function 406a at function identifier 0. The firmware instructions 120 can assign bus identifier 4 to the bus downstream from the bridge device 118c. The firmware instructions 120 can identify that endpoint device 115b is connected to bus 4, and that endpoint device 115b responds to function 406b at function identifier 0, and function 406c at function identifier 1.

The firmware instructions 120 can identify hierarchical address data 130 that specifies a segment identifier 133 "0" and a BDF identifier 136 "3:0.0" for the endpoint device 115a and the function 406a. Since the root port 112 is on bus 0 of segment 0, the hierarchical address data 130 can include 0:3:0.0 corresponding to Segment:Bus:Device.Function. The firmware instructions 120 can identify the hierarchical address data 130 that specifies Segment:Bus:Device.Function 0:4:0.0 for function 406b of the endpoint device 115b. The firmware instructions 120 can identify Segment:Bus:Device.Function 0:4:0.1 for function 406c of the endpoint device 115b.

The firmware instructions 120 can generate a synthetic segment and synthetic segment identifier 143 for each bus with an endpoint device 115 that is connected, and set the bus identifier for the synthetic segment to 0. The synthetic segment identifier 143 can start at any number or offset. In this example, the resulting synthetic address data 140 for the bridge device 118a can include Syntheticsegment:Bus:Device.Function 21:0:0.0. The firmware instructions 120 can generate a synthetic segment and synthetic segment identifier 143 for bridge devices 118 including the host bridge of the root port 112. However, in some cases, the bridge devices 118 are not assigned to a new synthetic segment, and are instead enumerated under an existing synthetic segment or using its standard physical or logical segment.

The host bridge device can correspond to the hierarchical address data 130 including Segment:Bus:Device 0:0.0, and the synthetic address data 140 including Syntheticsegment:Bus:Device 20:0.0. Bridge devices 118, including the host bridge device, can be marked as disabled so that they are not exposed to the operating system 124. Each synthetic segment 144 can be associated with a particular ECAM base address referred to as a synthetic segment base address 149.

For the bridge device 118a, the firmware instructions 120 can generate hierarchical Segment:Bus:Device 0:1:0.0 and Syntheticsegment:Bus:Device 21:0:0.0. For bridge device 118b, the firmware instructions 120 can generate hierarchical Segment:Bus:Device 0:2:0.0 and Syntheticsegment:Bus:Device 22:0:1.0. For bridge device 118c, the firmware instructions 120 can generate hierarchical Segment:Bus:Device 0:2:1.0 and Syntheticsegment:Bus:Device 23:0:1.0.

For endpoint device 115a and function 406a, the firmware instructions 120 can generate hierarchical Segment:Bus:Device 0:3:0.0 and Syntheticsegment:Bus:Device 24:0:0.0. For endpoint device 115b and function 406b, the firmware instructions 120 can generate hierarchical Segment:Bus:Device 0:4:0.0 and Syntheticsegment:Bus:Device 25:0:0.0. For endpoint device 115b and function 406c, the firmware instructions 120 can generate hierarchical Segment:Bus:Device 0:4:0.1 and Syntheticsegment:Bus:Device 25:0:0.1.

The firmware instructions 120 can generate configuration space data 151 and ACPI data 154 using the synthetic address data 140. The firmware instructions 120 can also use the hierarchical address data 130 as well as the mapping between the synthetic address data 140 and the hierarchical address data 130 to generate some aspects of the configuration space data 151 and the ACPI data 154. The operating system 124 can use the configuration space data 151 and the ACPI data 154 to access the endpoint device 115. The synthetic address data 140 can represent any complex hierarchical structure of busses as a set of busses directly attached to corresponding root ports 112 of a root complex of the computing device 103. This can be done regardless of how many real root ports 112 actually exist and how many physically and logically defined segments exist on the computing device 103.

Figure 5:
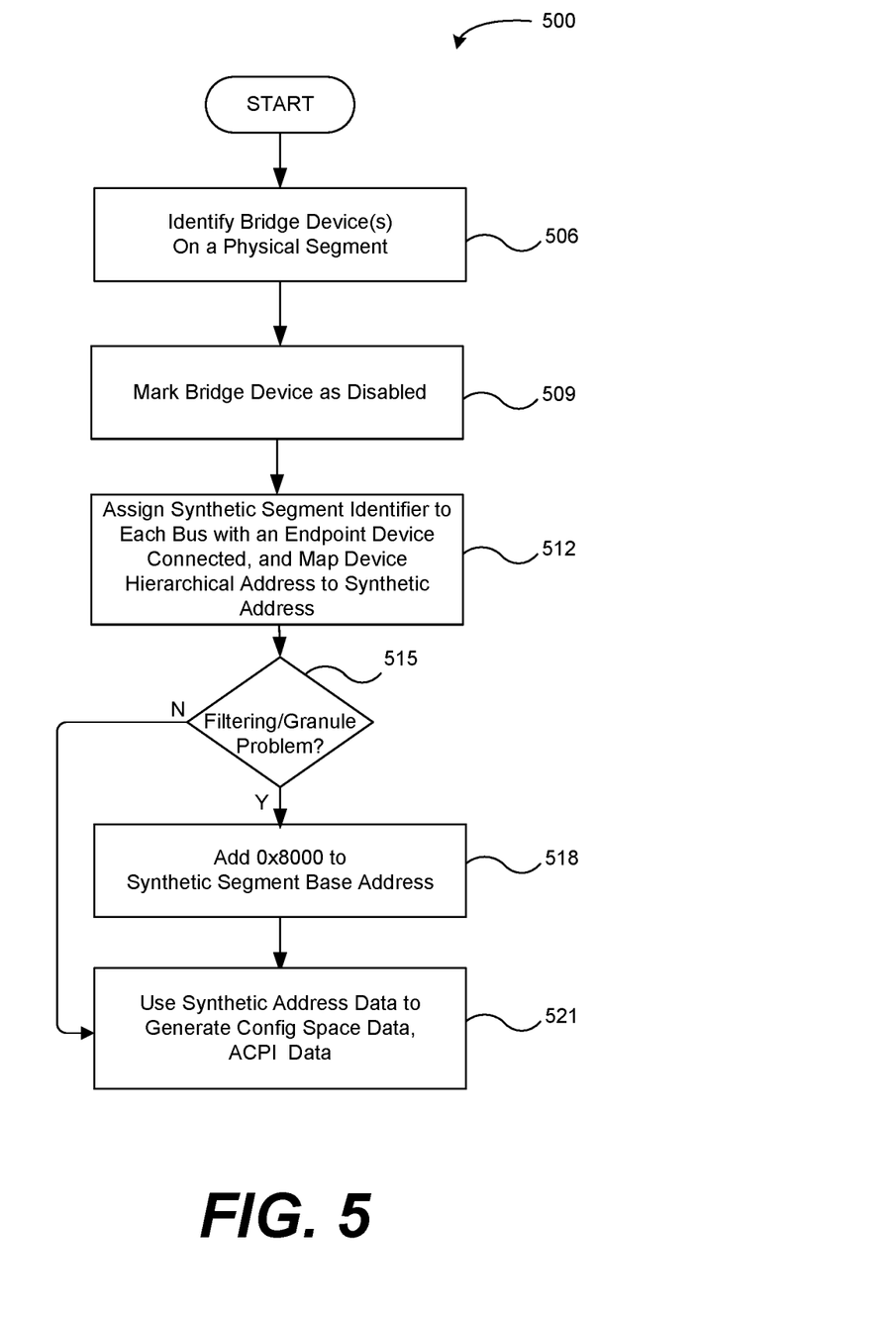
FIG. 5 is a flow chart depicting the operation of the computing device of FIG. 1, according to examples of the disclosure.

FIG. 5 is a flowchart 500 depicting the operation of the computing device 103 of FIG. 1. The firmware instructions 120 can scan the computing device 103 to identify both the hierarchical address data 130, synthetic address data 140, and a mapping between the two. The mapping can be stored as ACPI data 154 or otherwise in a memory 109 of the computing device 103. Generally, this example focuses on how the firmware instructions 120 can create synthetic address data 140 that exposes nonstandard PCIe configuration space implementations as ECAM-compatible. While the actions are discussed as performed by the firmware instructions 120, other instructions such as operating system instructions, ASL instructions, and other components can perform certain aspects of the flowchart 500.

In step 506, the firmware instructions 120 can identify a bridge device 118 on a particular physical segment. A bridge device 118 can connect to an upstream bus and expose or provide a downstream bus, to which other devices can be connected. The firmware instructions 120 can identify the bridge devices 118 that provide a downstream bus.

In step 509, the firmware instructions 120 can mark the bridge device 118 as disabled. Marking the bridge device 118 can cause the operating system 124 to ignore the bridge device 118. While the bridge device 118 can still be used to communicate instructions to the connected endpoint device 115, the operating system 124 will not attempt to traverse the bus hierarchy or identify downstream devices.

In step 512, the firmware instructions 120 can assign a synthetic segment identifier 143 to each bus that has an endpoint device 115 connected to it. The firmware instructions 120 can also set the bus identifier in the synthetic BDF identifier 146 for the endpoint device 115 to 0. The resulting synthetic segment identifier 143 and synthetic BDF identifier 146 can be stored as synthetic address data 140. The firmware instructions 120 can also map the synthetic address data 140 to the hierarchical address data 130. The mapping can be used to generate the ACPI data 154 that enables MSI, prevents MSI errors, and prevents other operating system 124 errors.

In step 515, the firmware instructions 120 can identify whether the endpoint device 115 has a filtering problem or a minimum granule problem. In some cases, this can be performed only for a first bus downstream from a root port 112, since such devices are the most likely to experience a mirroring or shadowing that is caused by at least one of a filtering problem and a minimum granule problem. The firmware instructions 120 can identify whether the minimum granule size is greater than the PCIe device configuration space of 32k. For example, the firmware instructions 120 can use register interactions to identify whether a particular endpoint device 115 responds to device 1 as well as device 0. If the device responds similarly to instructions addressed to device 1 as instructions addressed to device 0, then the firmware instructions 120 can identify that the endpoint device 115 has at least one of a filtering problem and a minimum granule problem. If there is a filtering problem or a minimum granule problem, then the process can move to step 518. Otherwise, the process can move to step 521.

In step 518, the firmware instructions 120 can add 0x8000 to a synthetic segment base address 149. The firmware instructions 120 can identify the synthetic segment base address 149 for the synthetic segment identifier 143 assigned to the subject endpoint device 115. The firmware instructions 120 can then add 0x8000 to that synthetic segment base address 149 in order to prevent delivery of errant instructions that address the wrong device (e.g., device identifier 1 rather than device identifier 0).

In step 521, the firmware instructions 120 can use synthetic address data 140 to generate configuration space data 151 and other ACPI data 154 for use by an operating system 124. The firmware instructions 120 can generate configuration space data 151 and ACPI data 154 using the synthetic address data 140. The firmware instructions 120 can also use the hierarchical address data 130 as well as the mapping between the synthetic address data 140 and the hierarchical address data 130 to generate some aspects of the configuration space data 151 and the ACPI data 154. The operating system 124 can use the configuration space data 151 and the ACPI data 154 to access the endpoint device 115. Since this information can include the synthetic address data 140, the operating system 124 can access any complex hierarchical structure of busses as if each bus were directly attached to a root port 112.

The flowcharts and figures include examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or another system. If embodied in hardware, each element can represent a circuit or a number of interconnected circuits that implement the specified logical function(s).

Although the flowcharts and figures can show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or a troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or more processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or another system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A non-transitory computer-readable medium comprising machine-readable instructions, wherein the instructions, when executed by at least one processor, cause a computing device to at least:

identify, by firmware instructions executed by the at least one processor, that a bridge device is on a segment corresponding to a root complex of the computing device;

detect, by the firmware instructions, that an endpoint device is connected to a bus downstream from the bridge device;

assign, by the firmware instructions, a synthetic segment identifier to the bus based at least in part on the endpoint device being identified as connected to the bus; and generate, by the firmware instructions, synthetic address data that includes the synthetic segment identifier, and sets a bus identifier of the bus to zero regardless of a hierarchical position of the bus in a standard peripheral component interconnect express (PCIe) bus hierarchy.

2. The non-transitory computer-readable medium of claim 1, wherein the instructions, when executed by the at least one processor, cause the computing device to at least:

load, by the firmware instructions, ACPI data into a memory of the computing device, the ACPI data comprising at least a portion of the synthetic address data.

3. The non-transitory computer-readable medium of claim 2, wherein the instructions, when executed by the at least one processor, cause the computing device to at least:

access, by an operating system, the endpoint device based at least in part on the ACPI data comprising the at least the portion of the synthetic address data.

4. The non-transitory computer-readable medium of claim 2, wherein the instructions, when executed by the at least one processor, cause the computing device to at least:

mark, by the firmware instructions, the bridge device as disabled in the ACPI data.

5. The non-transitory computer-readable medium of claim 1, wherein the instructions, when executed by the at least one processor, cause the computing device to at least:

identify, by the firmware instructions, a filtering problem or a minimum granule size problem that causes a function of the endpoint device to errantly respond to a nonzero device identifier.

6. The non-transitory computer-readable medium of claim 5, wherein the instructions, when executed by the at least one processor, cause the computing device to at least:

add, by the firmware instructions, 0x8000 to a base address corresponding to the synthetic segment identifier.

7. The non-transitory computer-readable medium of claim 6, wherein the instructions, when executed by the at least one processor, cause the computing device to at least:

generate, by the firmware instructions, an input output remapping table that indicates a predetermined instruction that handles functions corresponding to a synthetic segment base address modification comprising the 0x8000 added to the base address.

8. A system, comprising:

a computing device comprising at least one processor; and at least one memory comprising machine-readable instructions, wherein the instructions, when executed by the at least one processor, cause the computing device to at least:

identify, by firmware instructions executed by the at least one processor, that a bridge device is on a segment corresponding to a root complex of the computing device;

detect, by the firmware instructions, that an endpoint device is connected to a bus downstream from the bridge device;

assign, by the firmware instructions, a synthetic segment identifier to the bus based at least in part on the endpoint device being identified as connected to the bus; and generate, by the firmware instructions, synthetic address data that includes the synthetic segment identifier, and sets a bus identifier of the bus to zero.

9. The system of claim 8, wherein the instructions, when executed by the at least one processor, cause the computing device to at least:

load, by the firmware instructions, ACPI data into a memory of the computing device, the ACPI data comprising at least a portion of the synthetic address data.

10. The system of claim 9, wherein the instructions, when executed by the at least one processor, cause the computing device to at least:

access, by an operating system, the endpoint device based at least in part on the ACPI data comprising the at least the portion of the synthetic address data.

11. The system of claim 9, wherein the instructions, when executed by the at least one processor, cause the computing device to at least:

mark, by the firmware instructions, the bridge device as disabled in the ACPI data.

12. The system of claim 8, wherein the instructions, when executed by the at least one processor, cause the computing device to at least:

identify, by the firmware instructions, a filtering problem or a minimum granule size problem that causes a function of the endpoint device to errantly respond to a nonzero device identifier.

13. The system of claim 12, wherein the instructions, when executed by the at least one processor, cause the computing device to at least:

add, by the firmware instructions, 0x8000 to a base address corresponding to the synthetic segment identifier.

14. The system of claim 13, wherein the instructions, when executed by the at least one processor, cause the computing device to at least:

generate, by the firmware instructions, an input output remapping table that indicates a predetermined instruction to handle functions corresponding to a synthetic segment base address modification comprising the 0x8000 added to the base address.

15. A method comprising:

identifying, by firmware instructions executed by at least one processor, that a bridge device is on a segment corresponding to a root complex of a computing device;

detecting, by the firmware instructions, that an endpoint device is connected to a bus downstream from the bridge device;

assigning, by the firmware instructions, a synthetic segment identifier to the bus based at least in part on the endpoint device being identified as connected to the bus; and generating, by the firmware instructions, synthetic address data that includes the synthetic segment identifier, and sets a bus identifier of the bus to zero.

16. The method of claim 15, further comprising:

loading, by the firmware instructions, ACPI data into a memory of the computing device, the ACPI data comprising at least a portion of the synthetic address data.

17. The method of claim 16, further comprising:

accessing, by an operating system, the endpoint device based at least in part on the ACPI data comprising the at least the portion of the synthetic address data.

18. The method of claim 16, further comprising:

marking, by the firmware instructions, the bridge device as disabled in the ACPI data.

19. The method of claim 15, further comprising:

identifying, by the firmware instructions, a filtering problem or a minimum granule size problem that causes a function of the endpoint device to errantly respond to a nonzero device identifier.

20. The method of claim 19, further comprising:

adding, by the firmware instructions, 0x8000 to a base address corresponding to the synthetic segment identifier.

* * * * *